April 8, 1952        H. N. SEYFERTH        2,592,200
MACHINE TOOL SPINDLE DRIVE
Filed Feb. 8, 1950
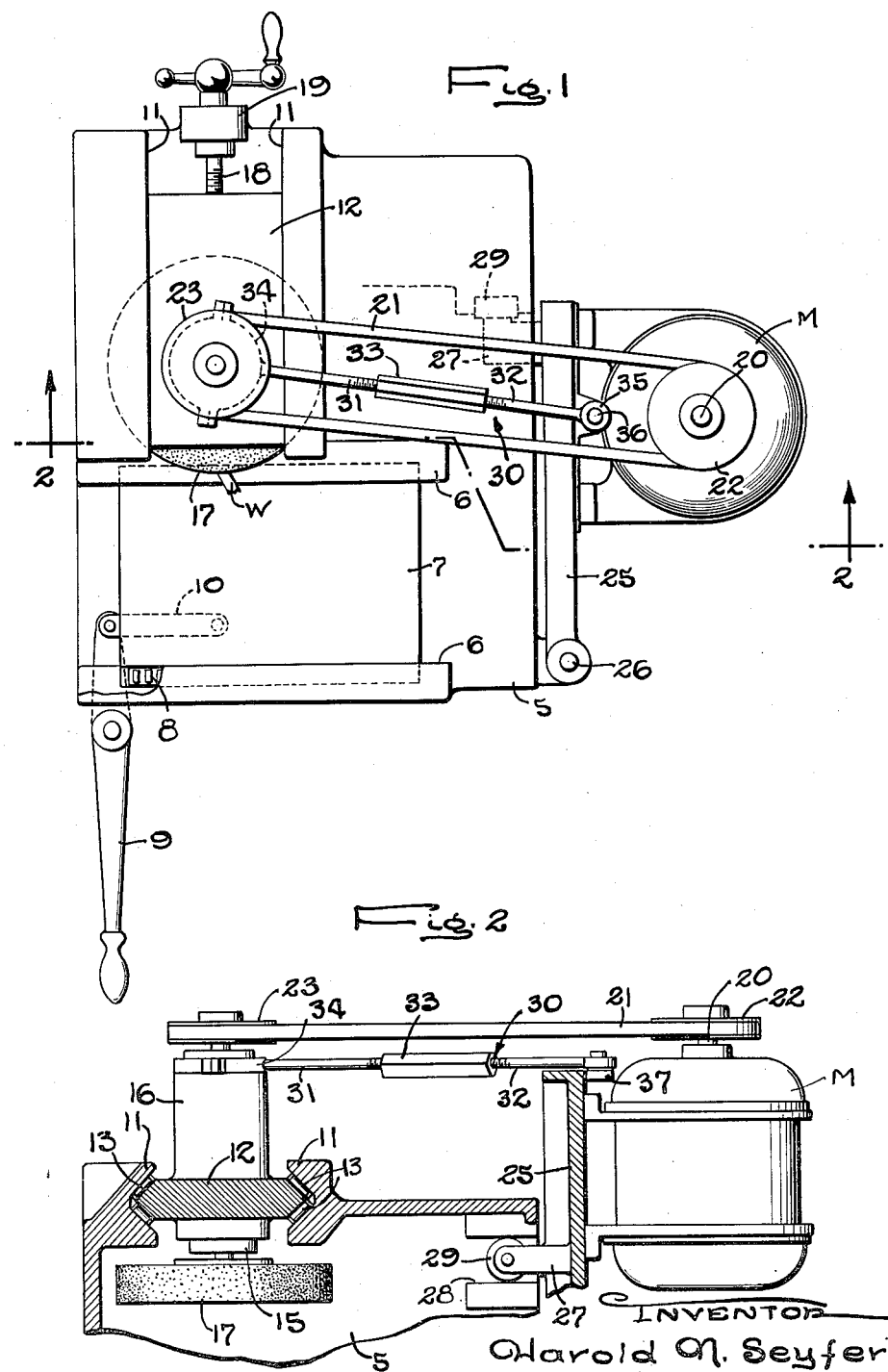

Patented Apr. 8, 1952

2,592,200

UNITED STATES PATENT OFFICE 2,592,200

MACHINE TOOL SPINDLE DRIVE

Harold N. Seyferth, East Detroit, Mich., assignor to Ex-Cell-O Corporation. Detroit, Mich., a corporation of Michigan Application February 8, 1950, Serial No. 143,030

2 Claims. (Cl. 51—134.5)

The invention relates to machine tools of the type having a belt-driven spindle supported for feeding or adjusting movement transversely of its axis and it is more particularly concerned with the drive for such spindles.

One object of the invention is to provide a spindle drive for machine tools of the above general character which permits the driving motor to be mounted independently of the spindle support and in which the spacing of the motor and spindle is maintained substantially constant and the tension of the driving belt is kept substantially uniform in all positions of the spindle.

Another object is to provide for driving an adjustably supported spindle from an independently supported motor without imposing any transverse strains on the spindle support.

Other objects and advantages of the invention will become apparent from the following detailed description of the preferred embodiment illustrated in the accompanying drawing, in which:

Figure 1 is a plan view of a machine tool equipped with a spindle drive embodying the features of the invention.

Fig. 2 is a fragmentary sectional view of the machine tool taken in offset planes substantially on the line 2—2 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the invention has been shown as incorporated in a precision grinding machine which is merely exemplary of the class of machine tools having high speed rotary spindles. The exemplary machine has a rigid frame 5 with spaced parallel ways 6 on its upper face for supporting and guiding a reciprocatory table 7 adapted to carry the work to be operated on, such as a workpiece W. The ways 6 are preferably of the type equipped with antifriction bearings 8 to reduce friction between the table and the ways. Reciprocation of the table 7 may be effected by power or manually, as by a hand lever 9 pivoted on the machine frame and connected with the table through the medium of a link 10.

A second set of ways 11 on the machine frame 5 supports and guides a tool slide 12 for movement transversely of the reciprocatory path of the work table 7. As herein shown, the ways 11 are similar to the ways 6 and are equipped with antifriction bearings 13 to facilitate translation of the slide.

The slide 12 carries a tool spindle 15 supported in this instance in an upright bearing 16 on the slide for rotation on an axis normal to the reciprocatory path of the slide. In the exemplary machine the spindle is arranged with its axis vertical and is adapted to carry at its lower end a suitable tool such as a grinding wheel 17 for operating on the workpiece W.

To adjust the position of the grinding wheel relative to the workpiece W or for coaction with other workpieces which may be of different size or differently located on the table 7, the tool slide 12 is shifted along its guideway toward or from the table. Any preferred mechanism may be utilized for that purpose, the mechanism shown comprising a manually operable adjusting screw 18 rotatably anchored in a bearing 19 on the machine frame and threaded into a cooperating nut carried by the slide 12.

In accordance with the invention, provision is made for rotatably driving the spindle 15 from driving means such as a motor M supported independently of the tool slide 12. Preferably the motor is adjustably mounted on the machine frame at one side of the slide 12 with its shaft 20 parallel to the spindle 15 and operatively connected therewith by an endless band, herein shown as a belt 21 running over grooved pulleys 22 and 23 fixed respectively on the shaft 20 of the motor and on the spindle.

Provision is made for automatically adjusting the position of the motor M relative to the spindle 15 incident to the movements of the tool slide 12 so as to maintain the spacing between the spindle and the motor shaft substantially constant in all positions of the slide. The tension of the belt 21 is thus kept uniform and uneven stressing of the spindle is avoided. This adjusting means is additionally arranged to react against the pull of the drive belt 21 and relieve the tool slide 12 of any transverse strains from the pull of the belt.

In the exemplary machine, support for the motor M is provided by a flanged supporting plate 25 mounted at one end on the machine frame 5 by pivot pins 26 so as to swing about an axis substantially parallel to the axis of the spindle 15. At its other or free end the plate 25 is supported by an extension 27 coacting with a bearing surface 28 on the frame. Preferably the coaction of the extension with the bearing surface is effected through antifriction bearing means such as a bearing element 29 (Fig. 2).

To coordinate the position of the motor supporting plate 25 with that of the adjustable tool slide 12, the plate and slide are interconnected so that movements of the slide are transmitted to the support in a manner effective to maintain a predetermined spacing of the motor M and the spindle 15. Such interconnection is preferably effected through the medium of a rigid strut 30 arranged with respect to the spindle and the motor so as to relieve the slide of any lateral strains from the pull of the belt 21. To this end, the strut 30 is pivotally connected at opposite ends to the slide and plate in alinement with the spindle and the motor shaft.

To provide for adjustment of belt tension, the strut 30 is preferably constructed in two sections 31 and 32 having their adjacent ends oppositely threaded and connected by a turnbuckle nut 33. For connection with the slide the section 31 is provided with a yoke 34 adapted to embrace a suitably machined portion of the bearing 16, thus locating the pivotal axis of the strut coincident with the axis of the spindle 15.

For connection with the motor supporting plate 25, the strut section 32 is formed as an eye 35 adapted to receive a pivot pin 36 anchored to the plate. In the present instance the pivot pin is carried by a projection 37 on the plate which serves to locate the pivotal axis of the motor in such close proximity to the axis of the motor shaft that no appreciable change in the spacing of the motor shaft and spindle occurs in the movement of the tool slide throughout its working range. As will be seen by reference to Fig. 2 the installation of the strut 30 in the above manner leaves the projecting ends of the spindle and motor shaft free of obstructions so that the pulleys mounted thereon may be quickly and easily interchanged when a change in the driving ratio is required.

In the operation of the machine tool, movement of the tool slide 12 to feed the grinding wheel to the work, to accommodate tools of different diameter or to accommodate workpieces differently positioned on the table 7, produces a simultaneous swinging of the motor support 25 about its pivot through the connection provided by the strut 30. Such rocking of the motor support maintains the spacing of the spindle 15 and motor shaft 20 substantially constant and keeps the belt tension uniform in all positions of the slide. Moreover, the strut 30 reacts against the pull of the driving belt 21 so that the tool slide is relieved of lateral strains from that source. By reason of the absence of such strains and further since the tool slide is relieved of the weight of the spindle driving motor, the operating position of the tool may be adjusted with a high degree of precision and such precise adjustment is effectively maintained during the performance of the machining operations.

I claim as my invention:

1. In a machine tool, in combination, a frame, a slide supported for reciprocation on said frame, a spindle journaled on said slide with its axis normal to the reciprocatory path of the slide, a rotary motor having a shaft, means supporting said motor at one side of said slide with its shaft disposed parallel to the axis of said spindle, said supporting means comprising a rigid plate pivotally mounted at one end on said frame at one side of said spindle to swing about an axis parallel to the axis of the spindle whereby to shift the motor shaft laterally toward or from the slide, means at the other end of said plate coacting with bearing means on said frame for supporting and guiding the free end of the plate in its swinging movements, an endless belt drivingly connecting the motor shaft and said spindle, a rigid strut connected for pivotal movement about the axis of said spindle at one end and at the other end to said motor supporting means operative to swing the supporting means in response to movements of the slide so as to maintain the spacing of the spindle and the motor shaft substantially constant in all positions of the slide, said strut being disposed in a plane normal to the axes of said spindle and the motor shaft to enable it to relieve the slide of transverse strains incident to the pull of the belt, and means forming a part of said strut adjustable to vary the effective length of the strut and thereby regulate the tension of said belt.

2. In a machine tool, in combination, a frame, a slide supported on said frame for reciprocation in a horizontal plane, a spindle journaled on said slide with its axis disposed vertically, a rotary motor having a shaft, means supporting said motor in laterally spaced relation to said slide with its shaft disposed vertically, said supporting means comprising a rigid plate pivotally mounted at one end on said frame to swing about a vertical axis, an endless belt drivingly connecting the motor shaft and said spindle, a rigid strut connected pivotally at opposite ends to said slide and to said plate, said strut being disposed in a plane normal to the axes of said spindle and the shaft motor to render it effective to swing said plate in conformity with the reciprocatory movements of said slide so as to maintain the spacing of the spindle and the motor shaft substantially constant in all positions of the slide and to relieve the latter of transverse strains incident to the pull of the belt, and cooperating means on said frame and on the free end of said plate for supporting and guiding the plate in its swinging movements.

HAROLD N. SEYFERTH.

REFERENCES CITED

The following references are of record in the file of this patent:

UNITED STATES PATENTS

| Number | Name | Date |
|---|---|---|
| 1,888,480 | Storm et al. | Nov. 22, 1932 |
| 1,965,235 | Haas | July 3, 1934 |
| 1,976,130 | Kearns et al. | Oct. 9, 1934 |
| 2,379,405 | Armitage | July 3, 1945 |

FOREIGN PATENTS

| Number | Country | Date |
|---|---|---|
| 513,405 | Great Britain | Oct. 11, 1939 |